(12) United States Patent
Robinson

(10) Patent No.: US 12,399,829 B2
(45) Date of Patent: Aug. 26, 2025

(54) DYNAMIC EXTENSION OF CACHE COHERENCE SNOOP FILTER ENTRY

(71) Applicant: Microsoft Technology Licensing, LLC, Redmond, WA (US)

(72) Inventor: Eric Francis Robinson, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/325,863

(22) Filed: May 30, 2023

(65) Prior Publication Data

US 2024/0403218 A1    Dec. 5, 2024

(51) Int. Cl.
*G06F 12/0815* (2016.01)
*G06F 12/0831* (2016.01)

(52) U.S. Cl.
CPC ...... *G06F 12/0815* (2013.01); *G06F 12/0831* (2013.01); *G06F 2212/1044* (2013.01)

(58) Field of Classification Search
CPC ......... G06F 12/0815; G06F 2212/1044; G06F 12/0831
USPC .................................................. 711/146, 141
See application file for complete search history.

(56) References Cited

U.S. PATENT DOCUMENTS

| | | | |
|---|---|---|---|
| 6,631,447 B1 | 10/2003 | Morioka | |
| 9,223,711 B2 | 12/2015 | Philip | |
| 10,592,424 B2 | 3/2020 | Beard | |
| 10,657,055 B1 | 5/2020 | Jalal | |
| 11,550,720 B2 | 1/2023 | Ramagiri | |
| 2002/0124144 A1 | 9/2002 | Gharachorloo | |
| 2008/0147988 A1 | 6/2008 | Heller et al. | |
| 2008/0209133 A1 | 8/2008 | Ozer | |
| 2014/0052905 A1 | 2/2014 | Lih | |
| 2015/0012719 A1 | 1/2015 | Tune | |

(Continued)

FOREIGN PATENT DOCUMENTS

WO    2017155659 A1    9/2017

OTHER PUBLICATIONS

U.S. Appl. No. 18/340,359, filed Jun. 23, 2023.

(Continued)

*Primary Examiner* — Hosain T Alam
*Assistant Examiner* — Zubair Ahmed
(74) *Attorney, Agent, or Firm* — Holzer Patel Drennan

(57) ABSTRACT

The described technology provides a method including generating a base snoop filter (SFT) entry for a coherence granule (cogran) in agent cache, the base SFT entry comprising a tracking_information field configured to track a plurality of agent IDs, each agent ID identifying an agent that holds a copy of the cogran, determining a number of agents that hold the copy of the cogran, comparing the and number of agents that store the copy of the cogran with number of the plurality of agent IDs tracked in the tracking_information field of the base SFT entry; and in response to determining that the number of agents that hold the copy of the cogran is greater than the number of the plurality of agent IDs tracked in the tracking_information field of the base SFT entry, selecting a second SFT entry as an extra SFT entry, wherein the extra SFT entry is configured to store a portion of tracking vector wherein each bit of the tracking vector indicates cache validity state of the cogran for a related agent.

17 Claims, 12 Drawing Sheets

(56) References Cited

U.S. PATENT DOCUMENTS

| | | |
|---|---|---|
| 2016/0062890 A1 | 3/2016 | Salisbury |
| 2016/0062893 A1 | 3/2016 | Tune |
| 2016/0117249 A1 | 4/2016 | Lin |
| 2017/0255557 A1 | 9/2017 | Robinson |
| 2017/0286299 A1* | 10/2017 | Sury .................. G06F 12/0811 |
| 2019/0073304 A1 | 3/2019 | Jiang |
| 2020/0042446 A1 | 2/2020 | Mittal |
| 2020/0218657 A1 | 7/2020 | Forrest |
| 2020/0250098 A1 | 8/2020 | Ma |
| 2021/0294743 A1 | 9/2021 | Randall |
| 2022/0100672 A1 | 3/2022 | Apte |
| 2022/0164288 A1* | 5/2022 | Ramagiri ............ G06F 12/0815 |
| 2022/0308999 A1 | 9/2022 | Randall |
| 2023/0100746 A1 | 3/2023 | Loison |
| 2023/0139212 A1 | 5/2023 | Randall |
| 2024/0403219 A1 | 12/2024 | Kaseridis |
| 2024/0419593 A1 | 12/2024 | Ramakrishna |
| 2024/0419594 A1 | 12/2024 | Panavich |
| 2024/0427703 A1 | 12/2024 | Robinson |

OTHER PUBLICATIONS

U.S. Appl. No. 18/336,637, filed Jun. 16, 2023.
U.S. Appl. No. 18/326,147, filed May 31, 2023.
U.S. Appl. No. 18/336,694, filed Jun. 16, 2023.
A. Moshovos, "RegionScout: Exploiting Coarse Grain Sharing in Snoop-Based Coherence", 32nd International Symposium on Computer Architecture (ISCA'05)—IEEE, Jun. 4, 2005, pp. 234-245.
Ehsan Atoofian, "Adaptive Snoop Granularity and Transactional Snoop Filtering in Hardware Transactional Memory", Canadian Journal of Electrical and Computer Engineering—IEEE, vol. 37, Issue 2, 2014, pp. 76-85.
International Search Report and Written Opinion received for PCT Application No. PCT/US2024/029558, Aug. 30, 2024, 15 pages.
International Search Report and Written Opinion received for PCT Application No. PCT/US2024/030161, Jul. 24, 2024, 12 pages.
Moshovos, et al., "JETTY: filtering snoops for reduced energy consumption in SMP servers", Proceedings HPCA Seventh International Symposium on High-Performance Computer Architecture—IEEE, Jan. 19, 2001, pp. 85-96.
Non-Final Office Action mailed on Jul. 8, 2024, in U.S. Appl. No. 18/326,147, 12 pages.
Notice of Allowance mailed on Aug. 27, 2024, in U.S. Appl. No. 18/340,359, 08 pages.
Zebchuk, et al., "Multi-grain coherence directories", MICRO-46: Proceedings of the 46th Annual IEEE/ACM International Symposium on Microarchitecture, Dec. 7, 2013, pp. 359-370.
International Search Report and Written Opinion received for PCT Application No. PCT/US2024/033323, Oct. 11, 2024, 11 pages.
International Search Report and Written Opinion received for PCT Application No. PCT/US2024/033480, Sep. 10, 2024, 15 pages.
International Search Report and Written Opinion received for PCT Application No. PCT/US2024/034880, Oct. 14, 2024, 14 pages.
Non Final Office Action mailed on Sep. 26, 2024, in U.S. Appl. No. 18/336,637, 09 pages.
Notice of Allowance mailed on Oct. 23, 2024, in U.S. Appl. No. 18/326,147, 9 pages.
Non-Final Office Action mailed on Feb. 13, 2025, in U.S. Appl. No. 18/336,694, 27 pages.
Notice of Allowance mailed on Feb. 10, 2025, in U.S. Appl. No. 18/326,147, 05 pages.
Notice of Allowance mailed on Feb. 13, 2025, in U.S. Appl. No. 18/340,359, 05 pages.
Notice of Allowance mailed on Feb. 14, 2025, in U.S. Appl. No. 18/336,637 10 pages.
Notice of Allowance mailed on Jun. 10, 2025, in U.S. Appl. No. 18/336,694, 10 pages.

\* cited by examiner

DYNAMIC EXTENSION OF CACHE COHERENCE SNOOP FILTER ENTRY

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and within the local caches of the PEs. Thus, to ensure that all of the PEs have a consistent view of the shared data, the processor-based device provides support for a cache coherence protocol to enable local changes to the shared data within one PE to be propagated to other PEs.

SUMMARY

The described technology provides a method including generating a base snoop filter (SFT) entry for a coherence granule (cogran) in agent cache, the base SFT entry comprising a tracking_information field configured to track a plurality of agent IDs, each agent ID identifying an agent that holds a copy of the cogran, determining a number of agents that hold the copy of the cogran, comparing the and number of agents that store the copy of the cogran with number of the plurality of agent IDs tracked in the tracking_information field of the base SFT entry; and in response to determining that the number of agents that hold the copy of the cogran is greater than the number of the plurality of agent IDs tracked in the tracking_information field of the base SFT entry, selecting a second SFT entry as an extra SFT entry, wherein the extra SFT entry is configured to store a portion of tracking vector wherein each bit of the tracking vector indicates cache validity state of the cogran for a related agent.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
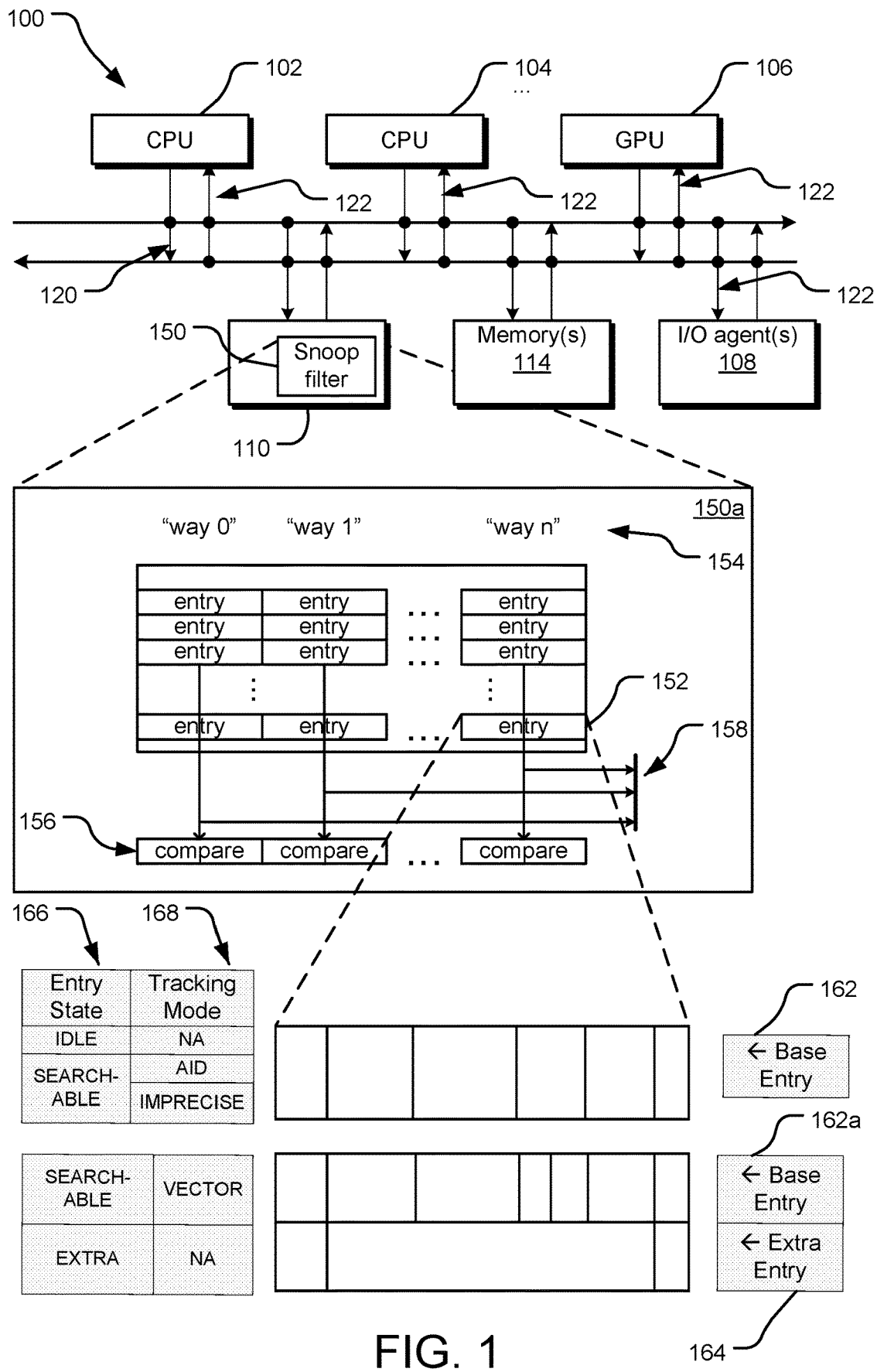
FIG. 1 illustrates an implementation of a system providing cache coherence using snoop filters.

Implementations disclosed herein disclose multi-processor systems that employ hardware (HW)-enforced cache coherency in which when an agent, such as a CPU, a GPU, etc., wants to access a memory location, HW automatically determines whether another agent currently holds a copy of that memory location. If the access is a read and the memory location is cached by another agent, system memory might be stale, in which case the access must be satisfied by obtaining the data from the other agent's cache. If the access is a write, typically other cached copies must be first written back to system memory. The memory block for which HW-enforced cache coherency is maintained is called a coherence granule (cogran) and system may match its cogran size to the cache line size.

In some implementations, the system may maintain a list of which cograns are currently cached by which agents. In other implementations, there may be no central coherence directory that needs to be maintained, and instead, during the course of handling the requested memory access, all agents are queried to determine whether any holds a copy of the cogran in their cache. This query is commonly referred to as a snoop. An over-snoop condition occurs when an agent is snooped to search for a cogran in its cache and that agent does not currently hold a copy of that cogran. The snoop is functionally useless and unnecessarily perturbs that agent. A system disclosed herein discloses advantageous implementations using a snoop filter (SFT) to help reduce over-snooping. Such implementations reduce over-snooping penalties in terms of latency added to the memory access, interconnect bandwidth consumed for no functional benefit, and energy wasted to perform unnecessary cache lookup(s) at the agents that are over-snooped. A snoop filter may be thought of as a higher-level, inclusive, set-associative cache that has no data and whose purpose is to track the entire set of cograns held by the lower-level cache(s) for which cache coherence needs to be maintained.

An imprecise snoop filter is a filter that tracks that a cogran has been cached by some agent at some point. This SFT is smaller than other types but the lack of precision means that when a snoop needs to be sent, all coherent caches in the system need to be snooped. The lack of precision also means that the SFT generally loses the ability to detect when the cogran has been evicted from all the coherent caches.

A precise snoop filter may employ a vector to track exactly which agents have cached a copy of a cogran. A precise SFT requires a relatively large amount of area to implement because it tracks a lot of state, 1 bit per agent per cogran tracked. In this implementation, when an agent obtains a copy of a cogran to write into its cache, the agent's corresponding vector bit in the SFT entry tracking that cogran is set. When the agent later evicts the cogran, its corresponding vector bit in the SFT entry tracking that cogran is cleared. This has a couple of advantages over the imprecise SFT: (a) only the exact agents that need to be snooped will be snooped; (b) the snoop scope can be further reduced over time as individual agents evict the cogran from their caches and the SFT is updated accordingly, this applies only to evictions that the agents communicate to the SFT.

In a hybrid implementation of an SFT may track precisely (n) agents (typically, 2-3) by recording their agent ID (AID) in the SFT's cogran tracking entry. The AID may be a unique identifier for each agent that the SFT tracks. For example, the AID could be an encode of the SFT vector position that agent may otherwise set. Alternatively, the AID may be the agent's interconnect address—the ID used by the interconnect to send messages to that agent. When >(n) agents have cached a copy of the cogran, the SFT switches from AID-tracking to imprecise-tracking. When the hybrid implementation is in an AID-tracking mode, there are no over-snoops because the SFT entry knows exactly whom to snoop. On the other hand, when the hybrid implementation is in an imprecise-tracking mode, the SFT entry indicates that all agents need to be snooped if the cogran is currently held, or tracked, by the SFT. When the system has many coherent agents (e.g., 128), this approach employs less HW than the precise vector SFT-recording a (n) AIDs (for a small enough n) require fewer state bits than a large vector.

In a system with many coherent agents (e.g., 128) the over-snooping due to imprecise tracking is very costly in terms of fabric bandwidth consumed and energy wasted. Furthermore, the larger SFT needed for precise tracking is very costly in terms of area which also causes snoop (and other) message travel distances to grow. Workloads with many agents sharing data structures or sharing instruction pages may quickly exhaust the precise-AID tracking ability of the hybrid approach and may lead to the imprecise tracking_mode being used more often. While some amount of over-snooping may be tolerated because the various imprecise tracking_modes generally don't have the ability to recover back to precise tracking as cograns are evicted, snoop filter management itself incurs an over-snooping overhead. Specifically, when the snoop filter is unable to know which cograns are no longer cached by any agents, the snoop filter may more frequently send "filter flush" snoops to make room in the SFT itself so that it may install a newly tracked cogran in the SFT.

FIG. 1 discloses an implementation of a cache coherence system 100 using snoop filters that improves upon one or more of the above implementations. Specifically, the cache coherence system 100 may be implemented on a multi-core architecture that includes a number of central processing unit (CPU) cores, 102 and 104, a graphical processing unit (GPU) 106, one or more input/output (I/O) agents 108, a point of serialization (PoS) 110, and a memory 114. Although the present example shows two CPU cores and one GPU, it is understood that any number of CPU cores and CPUs can be used without deviating from the scope of the present disclosure. Examples of the I/O agents 108 include, but are not limited to, Industry Standard Architecture (ISA) devices, Peripheral Component Interconnect (PCI) devices, PCI-X devices, PCI Express devices, Universal Serial Bus (USB) devices, Advanced Technology Attachment (ATA) devices, Small Computer System Interface (SCSI) devices, and InfiniBand devices.

The processing unit cores 102, 104, 106, and the I/O agents 108 may be referred to as agents 102-108, each referenced by agent IDs (AIDs). These agents 102-108 may have multiple levels of internal caches such as L1, L2, and L3 caches. As the agents 102-108 cache coherent memory blocks (cograns) in their internal caches, a snoop filter (SFT) 150 may keep track of those cograns and of which agents 102-108 have cached each one. Any of the agents 102-108 may issue coherent or non-coherent requests and the PoS 110 ensures the serialization of the memory access requests using the snoop filter 150 to provide memory coherency.

For example, the PoS 110 receives a coherent request 120 from a CPU 102. In response to the coherent request 120, the POS 110 issues a snoop command 122 to the CPU cores 104, the GPU 106, and the I/O agents 108. The CPU cores 104, the GPU 106, and the I/O agents 108 may provide the requested coherent information back to the PoS 110. When sending the snoop 122, the POS 110 refers to the SFT 150.

An example implementation of the SFT 150 is illustrated by SFT 150a. The SFT 150a includes a data structure to track the address and agent(s) 102-108 that have obtained a copy of every cogran that is currently cached by agents 102-108. The SFT 150a may be an n-way filter as indicated by n-arrays 154. The snoop filter 150a may include an array of entries 152, the content of the entries 152 is further described below. Each of the entries 152 may include a Tag field, such as the Tag field 218 disclosed in FIG. 2, that is used to store a tag portion of physical address (PA) that identifies a cogran. For example, for cogran size of 64 bytes, and SFT being a 16-way associative SFT, bits 15:6 of the PA may be used to select an SFT set and bits 47:16 of the PA may be stored as the tag in the Tag field 218 of the SFT entries 152. When the SFT 150a needs to perform a lookup to see if a cogran's PA is present in the SFT 150a, it selects one of the 16 sets using PA [15:6]. Subsequently, for the selected set, the SFT 150a may compare 156 the PA [47:16] against the tag values stored in the Tag field 218 of the 16 SFT entries 152 in the selected set. If the Tag field 218 of any of the 16 SFT entries in the selected set finds a match, then its way (e.g., way 5) is currently tracking the cogran being looked up.

In an implementation of the SFT 150a disclosed herein, a logical entry 152 may be configured to hold n agent IDs (AIDs) in a base SFT entry 162 and to dynamically allocate an extra SFT entry 164 in an SFT set for the cases where a cogran is shared by more than n agents. For example, in one implementation n may be three (3) such that the base SFT entry 162 is configured to hold 3 AIDs and in cases where a cogran is shared by more than 3 agents, the extra SFT entry 164 is dynamically allocated. Additionally, when the extra SFT entry 164 is dynamically allocated, the base SFT entry 162a may hold a portion of the SFT entry's tracking vector and the extra SFT entry 164 may hold another, remainder, portion of the SFT entry's tracking vector. Here a tracking vector includes a number of validity bits with the length of the tracking vector being the maximum number of agents 102-108 that might obtain the cogran corresponding to the Tag field of that SFT entry. There is thus a 1:1 correspondence between each agent instance and each bit of the tracking vector. In one implementation, the tracking vector may have 128 bits, thus tracking 128 agents 102-108 for the cogran corresponding to the Tag field of that SFT entry. Each validity bit may take a value of valid or invalid indicating a cache validity state of the cogran for an agent identified by the validity bit.

For example, the value of a validity bit being valid may indicate that the agent 102-108 that corresponds to that validity bit has cached the cogran corresponding to the Tag field of that SFT entry in its private cache, referred to as a valid cache validity state for that agent. On the other hand, a value of invalid for an invalidity bit indicates that the agent 102-108 that corresponds to that validity bit has not cached the cogran corresponding to the Tag field of that SFT entry in its private cache, referred to as an invalid cache validity state for that agent 102-108. The tracking vector and the validity bit values are further described below with respect to FIG. 4.

Specifically, the base SFT entry 162a holds the SFT entry's state information and the extra SFT entry 164 may give the base SFT entry 162a an additional storage needed to track additional agents, for example 128 agents, in a fine-grained manner for the times that a cogran is widely shared beyond the n AIDs in the base SFT entry 162a. In other words, a logical SFT entry in the SFT 150a may include either one base SFT entry 162 that may track up to n AIDs or combination of one base SFT entry 162a and an extra SFT entry 164 that is able to track every agent in the system that might coherently cache a cogran.

When the logical SFT entry includes only one base SFT entry 162, the entry_state field 166 of the SFT entry 162 may be either IDLE or SEARCHABLE and the Tracking_mode field 168 of the SFT entry 162 be one of NA (if entry_state=IDLE), AID or IMPRECISE. On the other hand, when the logical SFT entry includes a combination of one base SFT entry 162a and an extra SFT entry 164, the Entry_state field 166 of the base SFT entry 162a may be changed to SEARCHABLE and the Tracking_mode field 168 of the base SFT entry 162a may be changed to VECTOR. On the other hand, in this case, the Entry_state field 166 of the extra SFT entry 164 is set to EXTRA and the Tracking_mode field 168 of the extra SFT entry 164 is set to NA.

The detailed structure of the base SFT entries 162 and 162a, and the extra SFT entry 164 are illustrated in further detail below in FIG. 2. The implementation of the SFT entry 152 in the manner disclosed herein allows the cache coherence system 100 to take advantage of the fact that most cograns are not cached concurrently by more than a few of the agents 104-108.

Figure 2:
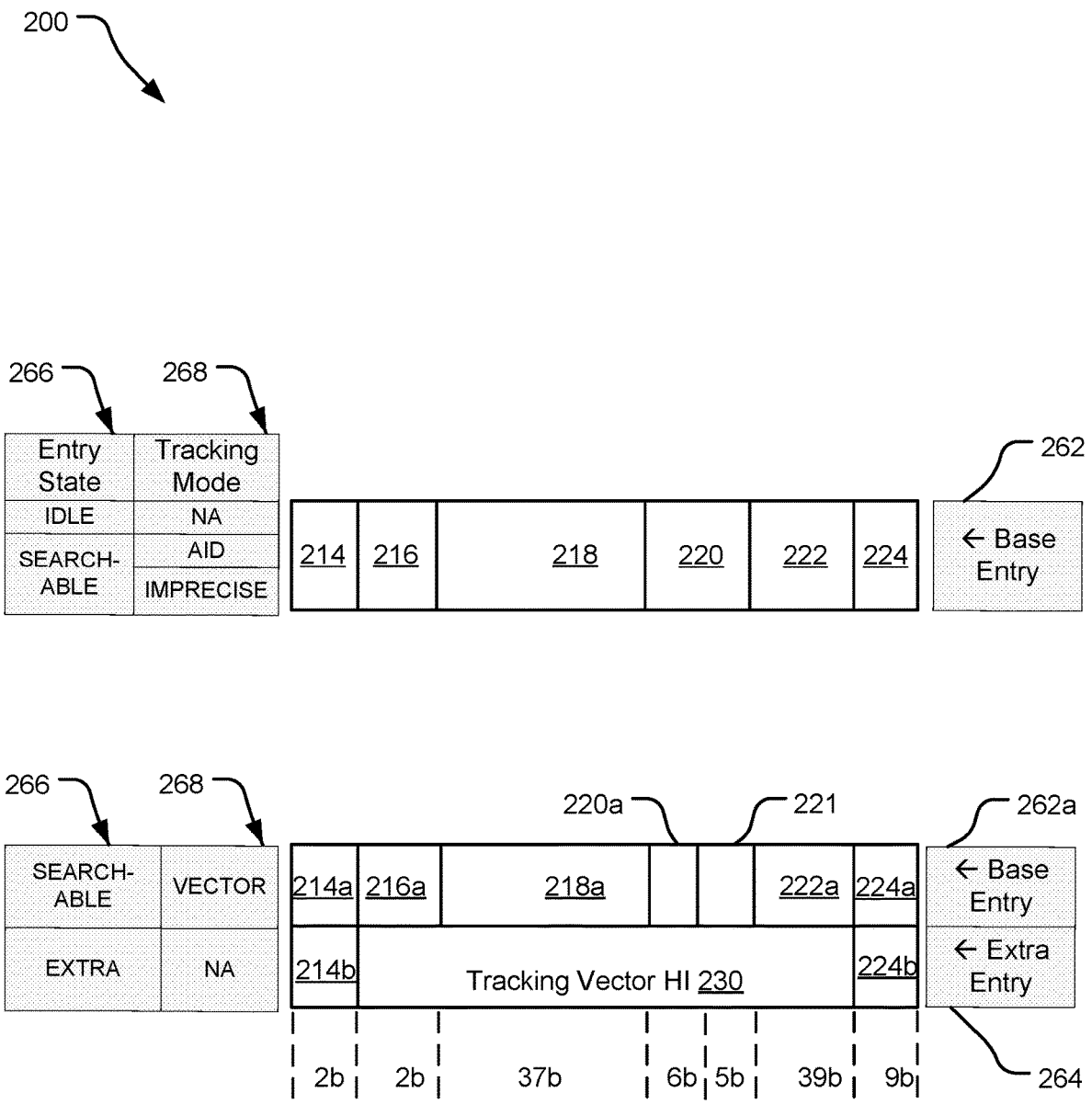
FIG. 2 illustrates an example structure of a snoop filter entry implementing the technology disclosed herein.

FIG. 2 illustrates a structure of a logical snoop filter entry 200 implementing the technology disclosed herein. Specifically, the logical snoop filter entry 200 may be configured to hold n agent IDs (AIDs) in a base SFT entry 262 and to dynamically allocate an extra SFT entry 264 in an SFT set for the cases where a cogran is shared by more than n agents. For example, in one implementation n may be three (3) such that the base SFT entry 262 is configured to hold 3 AIDs and in cases where a cogran is shared by more than 3 agents, the extra SFT entry 264 is dynamically allocated. Additionally, when the extra SFT entry 264 is dynamically allocated, the base SFT entry 262a may hold a portion of the SFT entry's tracking vector and the extra SFT entry 264 may hold another, remainder, portion of the SFT entry's tracking vector.

The base SFT entry 262 may include an Entry_state field 214 that may be set to either IDLE or SEARCHABLE. A Tracking_mode field 216 may be one of NA (if entry_state=IDLE), AID or IMPRECISE. Additionally, the base SFT entry 262 may include a Tag field 218 and a misc field 220. A Tracking_info field 222 may include 3 AIDs and an ECC field 224 may store error correction code bits.

The base entry 262a is configured for SFT hit determination and can hold a portion of the SFT entry's tracking vector. Specifically, an Entry_state field 214a that may be set to SEARCHABLE and a Tracking_mode field 216a that may be set to VECTOR. Additionally, the base SFT entry 262a may include a Tag field 218a and a misc field 220a, and an extra_entry field 221. A Tracking_info field 222a may include a portion of the SFT entry's tracking vector and an ECC field 224a may store error correction code bits. The extra_entry field 221 indicates which other SFT physical entry has been assigned to be the extra entry for the logical SFT entry to which a base SFT entry 262a belongs if that logical SFT entry 200 has an extra entry. In one implementation, the extra_entry field 221 is present, even when the logical SFT entry 200 has no associated extra entry. In an alternative implementation, the extra_entry field 221 does not exist when the implementation of the logical SFT entry 200 hard codes for each physical base SFT entry, which other physical entry has been pre-assigned to be that physical base SFT entry's extra entry when the logical SFT entry 200's state indicates that it has an extra entry. It may be determined that a logical SFT entry 200 has an extra entry when its Entry_state 214/214a is set to SEARCHABLE and its Tracking_mode 216/216a is set to VECTOR.

The extra SFT entry 264 may have its entry_state field 214b set to EXTRA and its Tracking_mode field is (not applicable) NA. The remainder of the portion of the SFT entry's tracking vector may be stored in the tracking_vector field 230. An ECC field 224b may store error correction code bits.

Thus, the logical SFT entry 200 is either (a) just the base SFT entry 262 when it has no associated extra SFT entry or (b) a combination of the base SFT entry 262a and its associated extra SFT entry 264. The base SFT entry 262 participates in SFT lookups in that the base SFT entry 262 contains a cogran's tag that is compared against tag bits of a physical address (PA) of the cogran to determine whether the lookup finds a hit in the SFT. For example, for a 64-byte cogran being tracked in a 16-way SFT, the tag bits of the PA of the cogran may be PA [47:16], which may be compared with a Tag field of the SFT entry 262. On the other hand, the extra SFT entry 264 may be associated with a base SFT entry, such as base SFT entry 262a and may contain agent tracking_information for that base SFT entry. The extra SFT entry 264 may not hold a cogran address and therefore does not participate in SFT lookup address compares.

Figure 3:
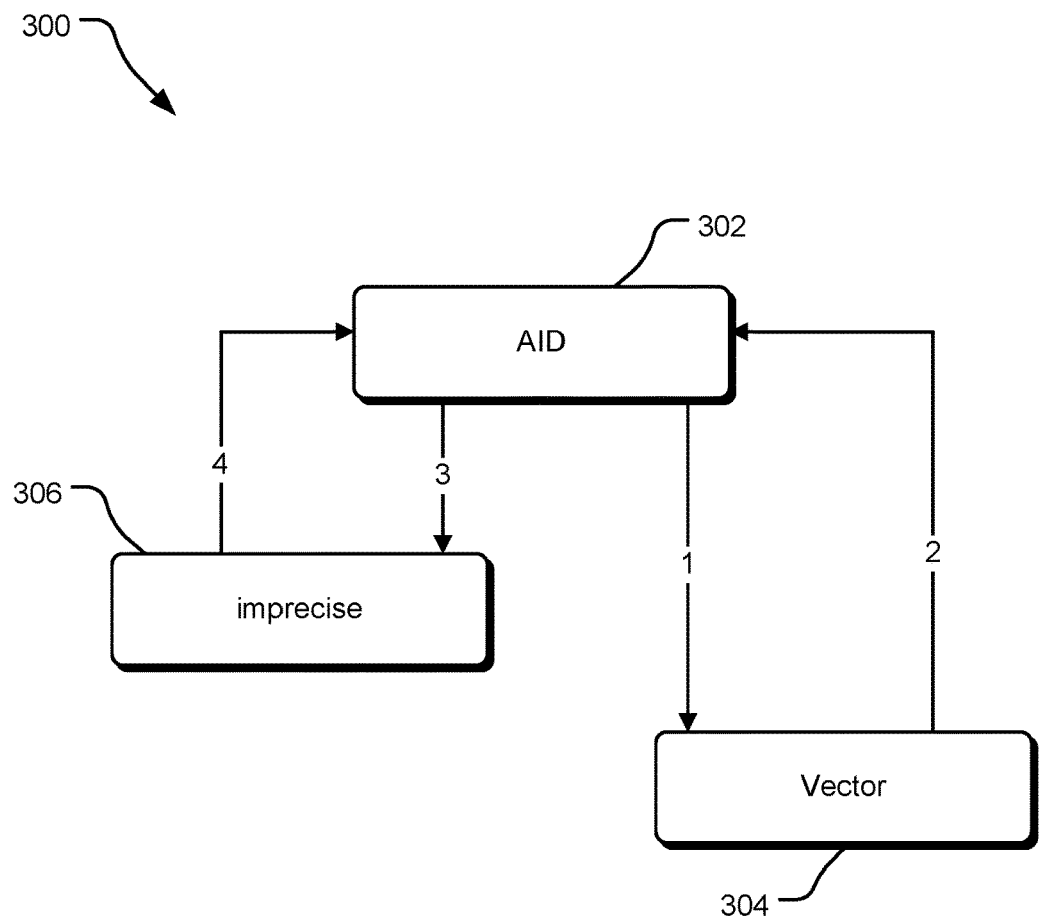
FIG. 3 illustrates example tracking modes for the logical SFT entry of the cache coherence system disclosed herein.

FIG. 3 illustrates example tracking modes 300 for the logical SFT entry of the cache coherence system disclosed herein. As illustrated herein the each logical SFT entry independently switches between the three tracking_modes, namely: AID, VECTOR, and IMPRECISE, depending on real-time conditions and its configuration settings. At the time of its allocation an entry would start in AID mode 302. If the ability to add new AIDs to its tracking is exhausted the logical SFT entry switches to either Vector mode 304 or to Imprecise mode 306. If the logical SFT entry switches to Vector mode 304, the logical SFT entry also takes one of any other entries in the same set for use as an extra SFT entry. While in the illustrated implementation, the Vector mode is a precise tracking mode where each bit represents a single AID, in an alternative implementation, the Vector mode may be an Imprecise mode where each bit represents a defined set of more than one AIDs.

Figure 4:
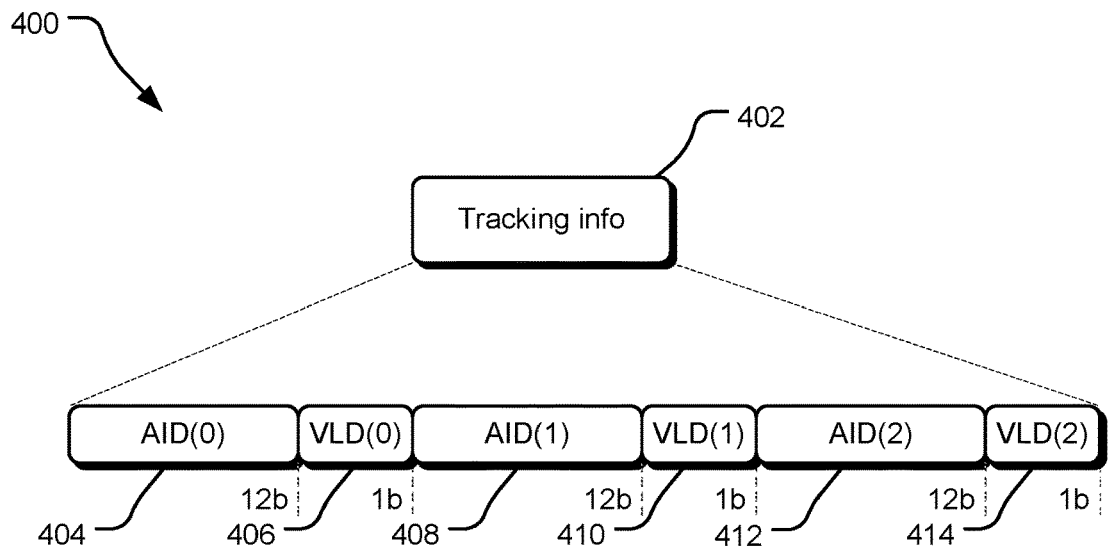
FIG. 4 illustrates example values of a tracking_information field for the logical SFT entry of the cache coherence system disclosed herein.
Figure 4:
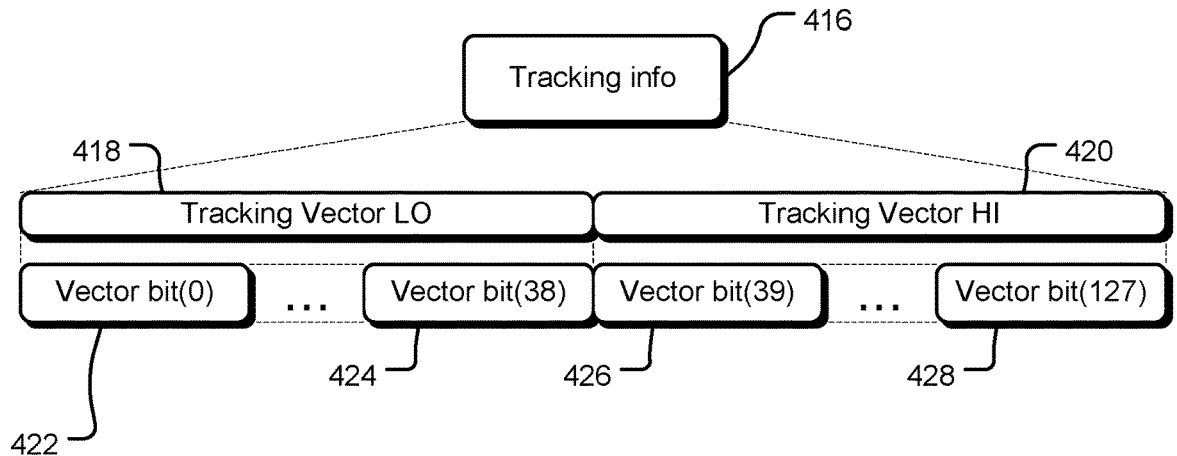

FIG. 4 illustrates example values of a tracking_info field 400 for the logical SFT entry of the cache coherence system disclosed herein. The tracking_info field 400 may store tracking information regarding the AIDs being tracked by the SFT entry. Specifically, in an AID mode, the width of the tracking_info field 402 may include 3 AIDs with a width of 13b each, including 12b to identify the AID and 1b to indicate whether the AID is currently valid. As illustrated herein, in the AID mode the tracking_info field 402 includes an AID (0) 404 and its validity bit 406, an AID (1) 408 and its validity bit 410, and an AID (2) 412 and its validity bit 414. In the Vector mode, 128*b* of the tracking_info field 416 are divided such that the first 39*b* of the tracking vector are stored in a tracking_vector_LO field 418 in base entry 262*a* with the remaining bits of the vector stored in a tracking_vector_HI field 420 in the extra entry 264. In this implementation, each agent that needs to be tracked by the SFT may have a unique validity bit in the tracking_info that maps to a particular vector bit position. Thus, for example, the tracking_vector_LO field 418 may have 39 validity bits 422-424 and the tracking_vector HI field 418 may have 89 validity bits 426-428. Thus, for example, if a validity bit 15 has a value valid, it indicates a valid cache validity state for the agent corresponding to the validity bit 15 indicating that this agent has cached the cogran corresponding to the Tag field of the SFT entry. On the other hand, if a validity bit 22 has a value invalid, it indicates an invalid cache validity state for the agent corresponding to the validity bit 22 indicating that this agent has not cached the cogran corresponding to the Tag field of the SFT entry.

Figure 5:
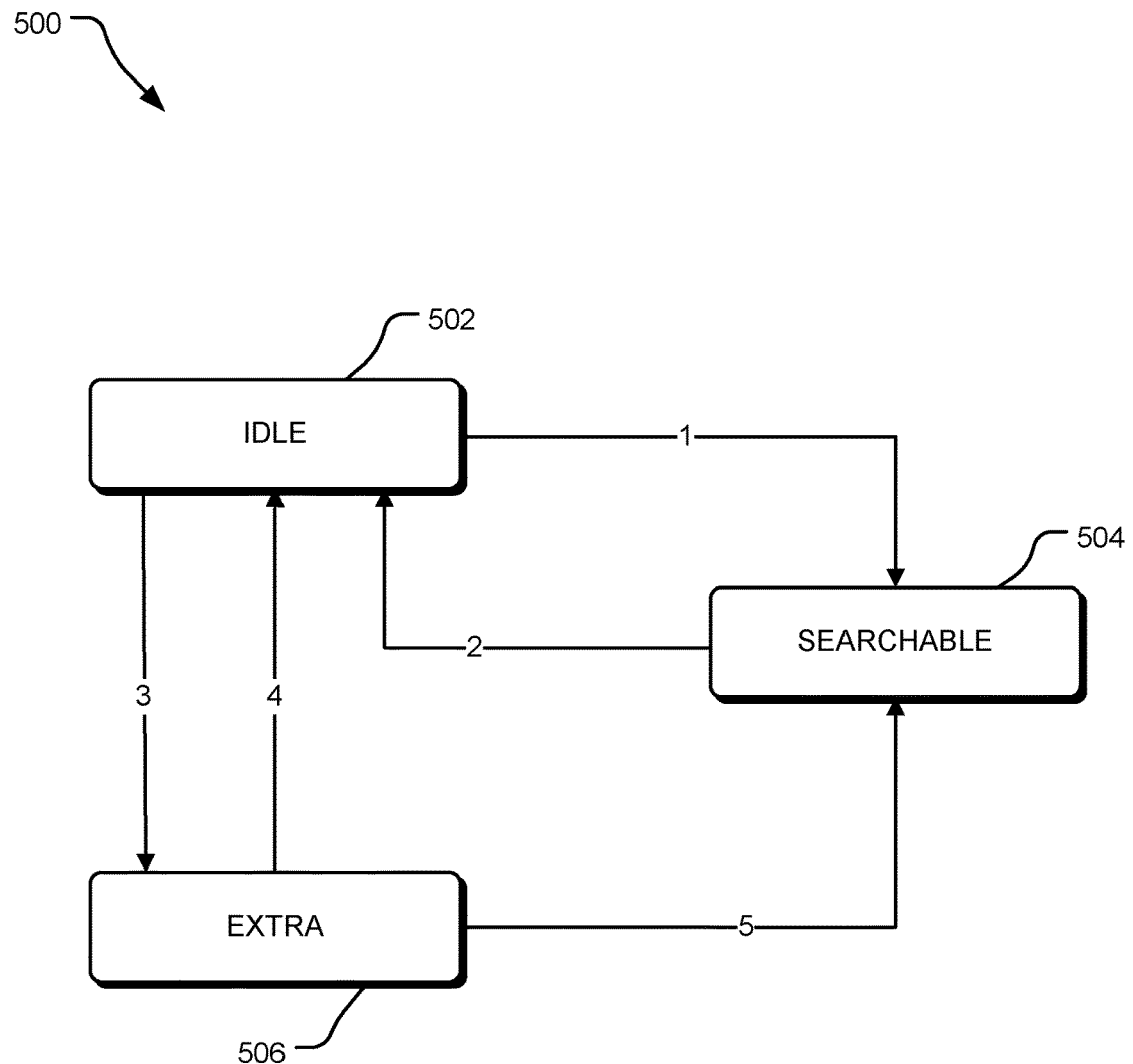
FIG. 5 illustrates example values for entry-state field for the logical SFT entry of the cache coherence system disclosed herein.

FIG. 5 illustrates values for entry-state field 500 for the logical SFT entry of the cache coherence system disclosed herein. Specifically, the implementations disclosed herein include an additional state for the entry-state field 500 for the physical SFT entry. Specifically, the physical SFT entry has an IDLE state 502, a SEARCHABLE state 504, and an EXTRA state 506. The IDLE state 502 may indicate the SFT entry being idle or not idle. The SEARCHABLE state 504 indicates that a Tag generated based on a portion of physical address of a cogran is stored in the SFT entry, which can be used to search if the cogran is being tracked by the SFT. that may need to be compared to see whether an SFT lookup finds a hit. The EXTRA state 506 indicates that the physical entry is in use, and it contains useful information, but it does not contain an address to be used for a lookup's compare operation.

Specifically, in the IDLE state 502, the physical entry is available to be used to allocate a new cogran as a base SFT entry as well as the physical entry is available to be used as an extra entry for a base SFT entry. In the SEARCHABLE state 504, the physical entry is neither available to allocate a new cogran nor to be an extra entry for any base entry. Furthermore, in this state, the physical entry may contain information that can be used to determine whether the SFT holds a cogran. Finally, during the Extra state 506, the physical entry is neither available to allocate a new cogran nor to be an extra entry for any base entry and the physical entry may contain, some or all, tracking_information on behalf of its associated base entry.

Figure 6:
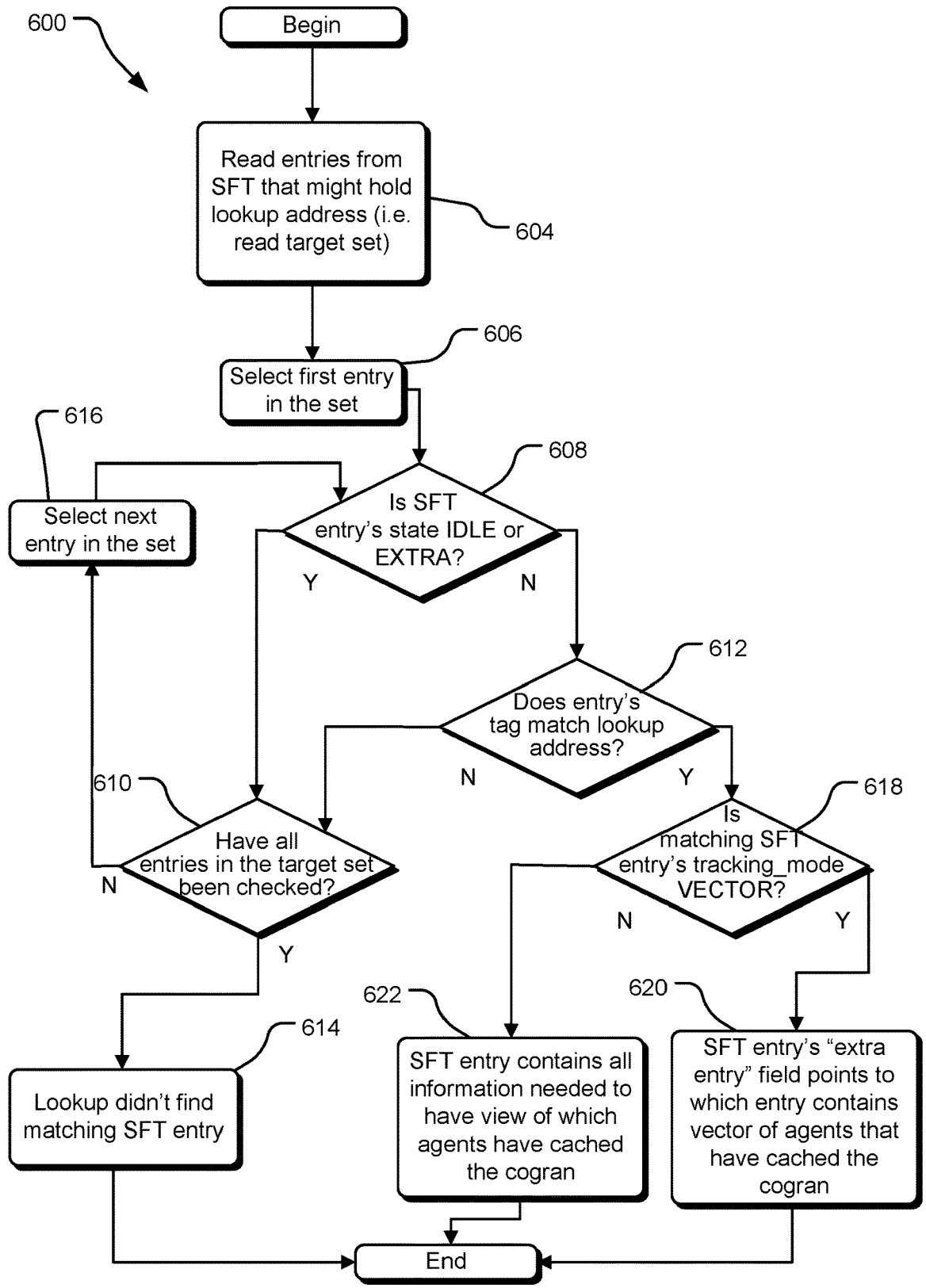
FIG. 6 illustrates example operations of SFT lookup for a set of cograns.

FIG. 6 illustrates operations 600 of SFT lookup for a set of cograns. One or more of the operations 600 may be performed by hardware, firmware, or software. Specifically, these operation are for a case when an agent wants to access a cogran and the SFT needs to be checked to see whether a snooping operation is needed. When an SFT lookup for a target cogran occurs, the set of physical SFT entries that may hold the target cogran is checked. Specifically, an operation 604 reads the set of physical SFT entries that may hold the target cogran. An operation 606 selects the first physical SFT entry from the set of physical SFT entries. An operation 608 determines if the state of the selected physical SFT entry is one of IDLE or EXTRA. If the state of the selected physical SFT entry is one of IDLE or EXTRA, the physical entry is skipped because it is not a base SFT entry. If the physical entry's state is set to SEARCHABLE, an operation 612 compares the physical entry's tag against the tag portion of the target cogran's address.

When the physical entry's tag is compared to the target cogran's address and finds a matching logical SFT entry, that indicates a lookup hit. In this case, the matching logical SFT entry is a base SFT entry. Subsequently, an operation 618 examines the tracking_mode field of the base SFT entry, matching logical entry that is hit, to determine whether that logical SFT entry includes an additional physical entry. Specifically, if the tracking_mode is set to VECTOR, then the logical SFT entry includes an additional physical entry and an operation 620 checks the "extra_entry" field of the hit logical SFT entry to determine which physical entry in the set has been designated as the extra entry for that SFT base entry for that logical SFT entry. On the other hand, if the tracking_mode of the base SFT entry is not set to VECTOR, an operation 622 determines that the physical SFT entry that hit is the only physical SFT entry comprising the logical SFT entry that hit.

If the operation 608 determines that the state of the selected physical SFT entry is one of IDLE or EXTRA, an operation 610 determines if all the entries in the target set have been checked. If not, an operation 616 selects the next entry in the target set. Otherwise, an operation 614 determines that the lookup through the target list did not find any matching SFT entry.

Figure 7:
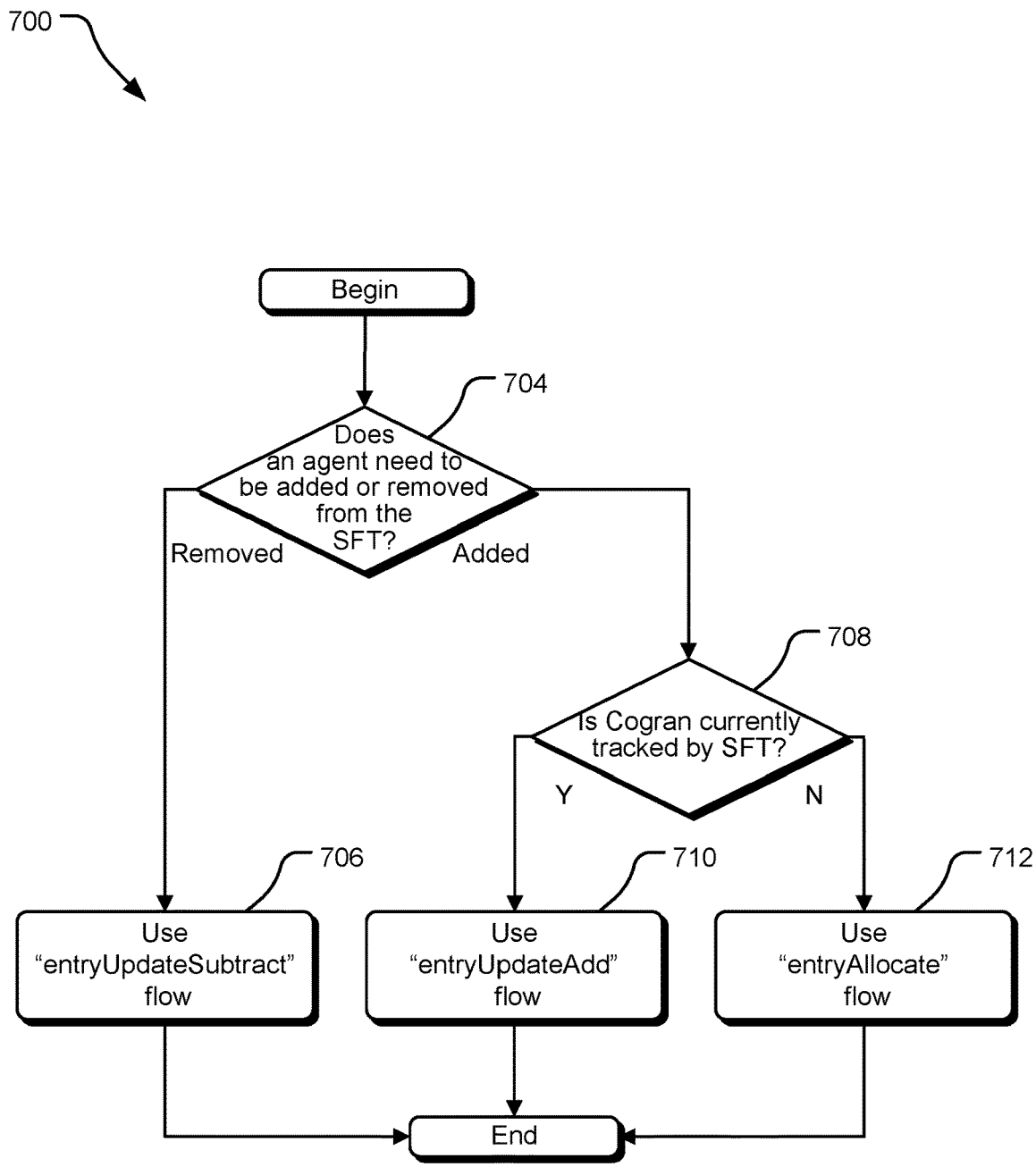
FIG. 7 illustrates example operations to determine which of the flows of operations is to be selected for an SFT update.

FIG. 7 illustrates operations 700 to determine which of the flows of operations is to be selected for an SFT update. Specifically, the operations 700 determine, for an SFT access, whether to allocate an entry (illustrated further below in FIG. 8), add an agent to an existing entry's tracking (illustrated further below in FIG. 9), or remove an agent from an existing entry's tracking (illustrated further below in FIG. 10). As illustrated, the operations 700 are implemented for a case when it is known that one of the following three is true for an agent and therefore an SFT update is needed: (a) the agent is accessing a cogran that's not currently tracked by the SFT but needs to be, (b) the agent is newly caching a cogran that's currently tracked by the SFT, and (c) the agent is known to have evicted its copy of a cogran that's currently tracked by the SFT.

An operation 704 determines if an agent needs to be added or removed from the SFT. If an agent does not need to be added an operation 706 uses an "entryUpdateSubtract" flow to remove an agent from an existing entry's tracking (illustrated further below in FIG. 10). If an agent needs to be added, an operation 708 determines if the cogran is currently tracked by the SFT. If yes, an operation 710 uses an "entryUpdateAdd" flow to add an agent to an existing entry's tracking (illustrated further below in FIG. 9). If no, an operation 712 uses an "entryAllocate" flow to allocate an entry (illustrated further below in FIG. 8).

Figure 8:
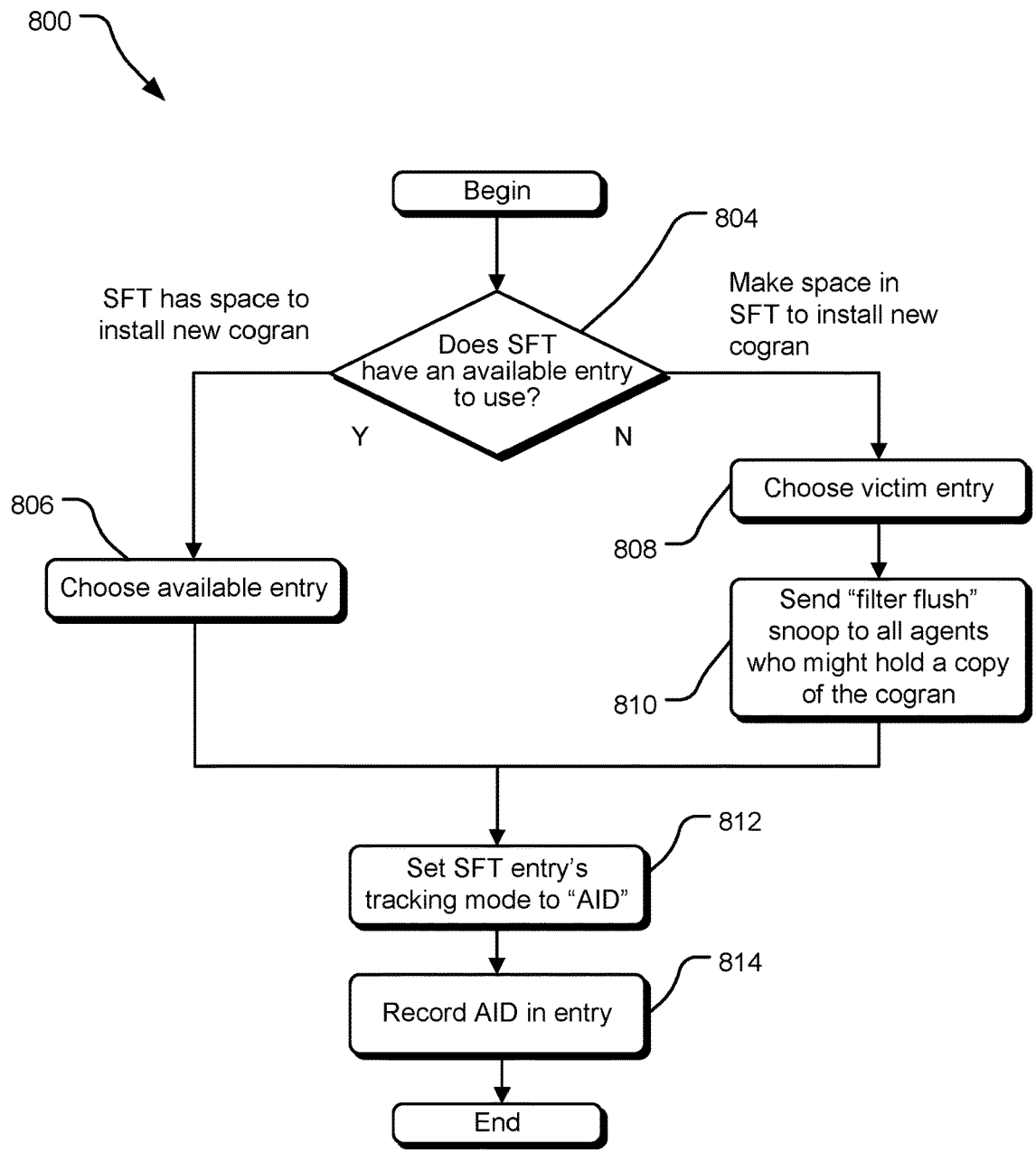
FIG. 8 illustrates example operations for a case when an agent newly catches a copy of a cogran that is not currently tracked by SFT.

FIG. 8 illustrates operations 800 for a case when an agent newly catches a copy of a cogran that is not currently tracked by SFT. When the SFT needs to add a new cogran to its tracking for the first time, it needs to determine if there are any available entries in the SFT that could accept the new cogran. An operation 804 determines if the SFT has an available entry to use for adding a new cogran. If the SFT has space to install a new cogran, an operation 806 selects one of these available entries to add the new cogran.

If the SFT does not have an available entry to use for adding a new cogran, it needs to make space in the SFT to install the new cogran by selecting a victim logical entry to remove and then sending a "filter flush" snoop to all agents indicated by the entry who might hold a copy of the old cogran (old-cogran being evicted). In this case, an operation 808 chooses the victim entry in the SFT and an operation 810 sends the "filter flush" snoop to all agents that may hold a copy of the cogran that is held by the victim entry.

Once the SFT has decided which physical entry will allocate the new cogran and the entry becomes available for use, the SFT sets the entry's entry_state to SEARCHABLE and sets the entry's tracking_mode to AID. At this point, there is only a single agent holding a coherent copy of the cogran in its cache. Therefore, an operation 812 sets the mode of the selected entry, whether chosen in operation 806 or the victim entry selected in operation 808, to AID. An operation 814 records the cogran's address and the AID to be tracked into the selected entry.

Figure 9:
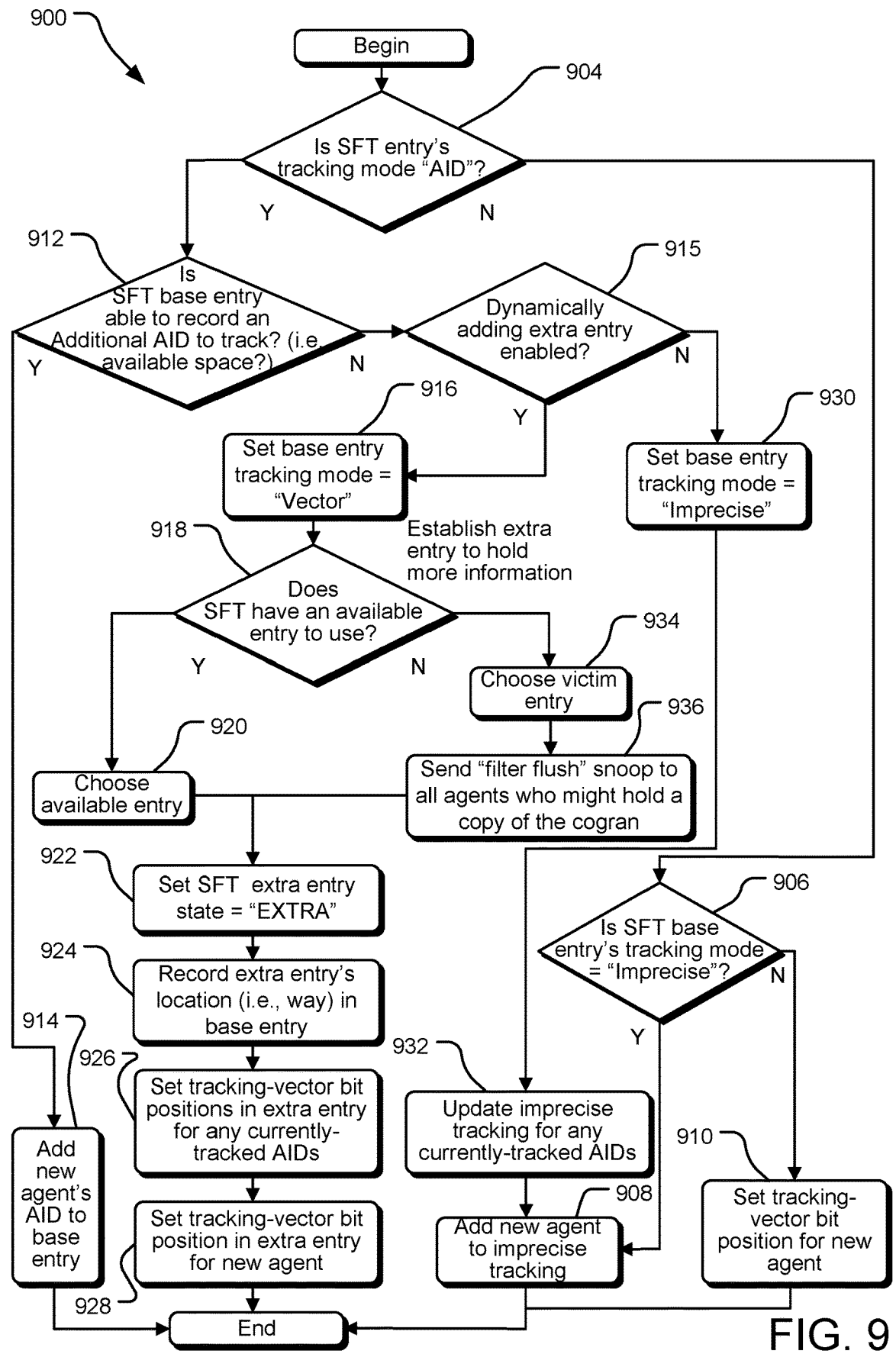
FIG. 9 illustrates example operations for a case when an agent newly catches a copy of a cogran that is currently being tracked by the SFT.

FIG. 9 illustrates operations 900 for a case when an agent newly caches a copy of a cogran that is currently being tracked by the SFT. Specifically, the operations 900 are activated when the SFT needs to add an agent to an existing logical SFT entry that is already tracking the cogran the agent is installing in its cache. An operation 904 determines if the existing logical entry's tracking_mode is set to AID. If no, an operation 906 determines if the base entry of the logical SFT entry has its tracking_mode set to "IMPRECISE." If yes, an operation 908 adds the new AID to imprecise tracking by updating the base entry to account for the new AID to be tracked. If the base entry of the logical SFT entry has its tracking_mode not set to "IMPRECISE," the logical SFT entry's tracking_mode is set to VECTOR. In this case, an operation 910 sets the tracking-vector bit position for new AID. Specifically, this vector bit may be in either the base entry or the extra entry, depending on how vector bits have been configured by the HW and which AID is being added to the entry.

If the operation 904 determines that the existing logical entry's tracking_mode is set to AID, an operation 912 determines if the base SFT entry is able to record an additional AID to its tracking_info, or that the tracking_info field has space available to record an additional AID. If yes, an operation 914 adds the new agent's AID to the tracking_info field of the base entry.

If the operation 912 determines that the base SFT entry is not able to record an additional AID to its tracking_info, an operation 915 determines if dynamic addition of adding an extra entry is enabled. For example, the operation 915 may check the "extra_entry" field of the SFT entry to determine if dynamic addition of adding an extra entry is enabled. If such dynamic addition is not enabled, an operation 930 updates the SFT entry's tracking_mode to be IMPRECISE. Subsequently, an operation 932 updates imprecise tracking for any currently tracked AIDs.

If the operation 915 determines that the base SFT entry is able to add an extra entry, an operation 916 updates the base entry's tracking_mode to be VECTOR. An operation 918 determines if the SFT has an available entry to use for adding a new cogran. If the SFT has space to install a new cogran, an operation 920 selects one of these available entries to add the new cogran.

If the SFT does not have an available entry to use for adding a new cogran, it needs to make space in the SFT to install the new cogran by selecting a victim logical entry to remove and then sending a "filter flush" snoop to all agents indicated by the entry who might hold a copy of the old cogran (old=cogran being evicted). In this case, an operation 934 chooses the victim entry in the SFT and an operation 936 sends a "filter flush" snoop to all agents that may hold a copy of the cogran that is held by the victim entry.

Once the physical entry is selected, an operation 922 sets its entry_state to EXTRA and an operation 924 records the extra entry's location in the base entry. Subsequently, an operation 926 sets the tracking vector bit position in the extra entry for any currently tracked AIDs and an operation 928 sets the tracking vector bit position in the extra entry for the new agent.

Figure 10:
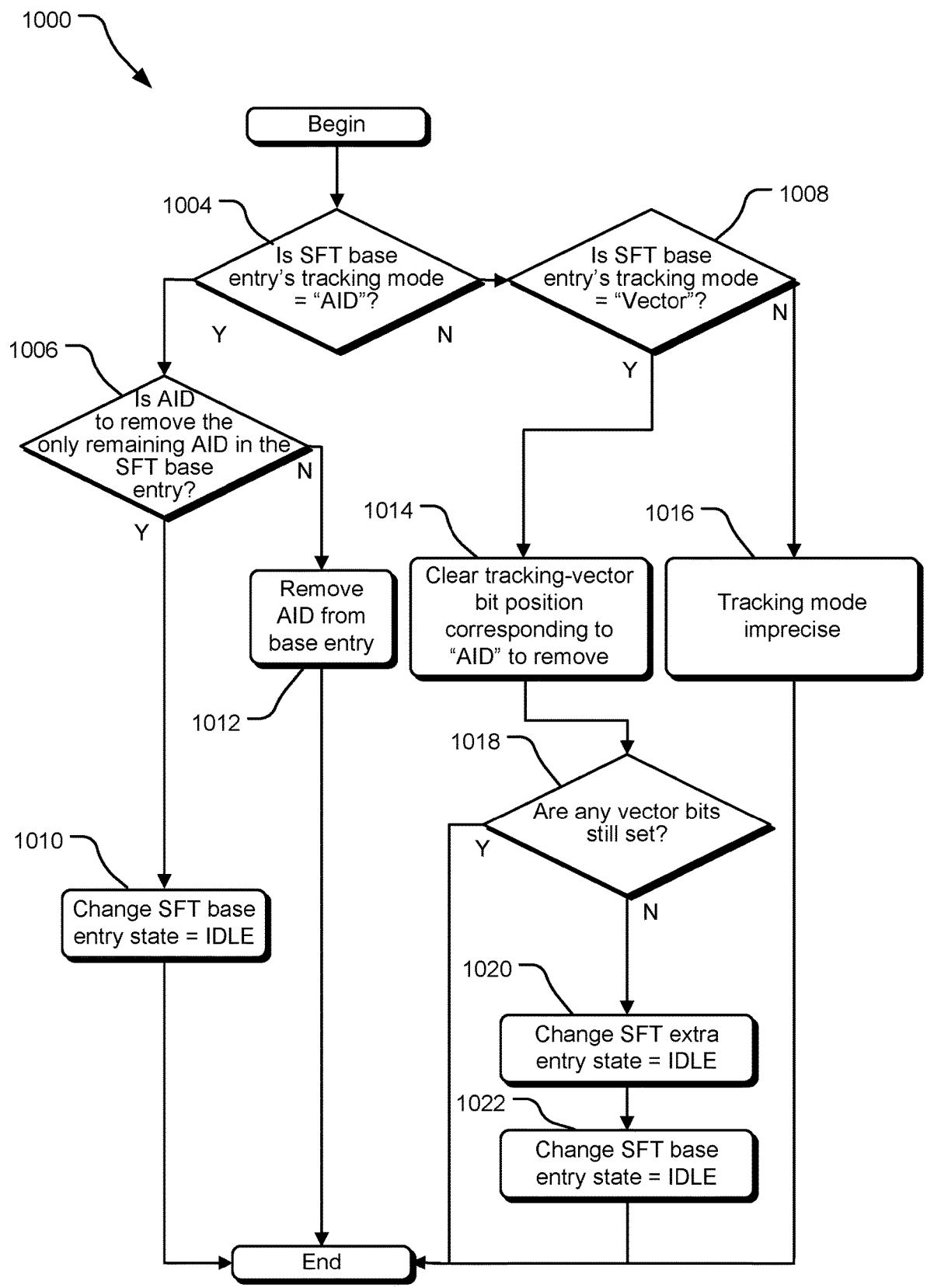
FIG. 10 illustrates example operations for a case when an agent communicates that it is evicting a cogran from its cache.

FIG. 10 illustrates operations 1000 for a case when the SFT needs to update an existing logical SFT entry to remove an agent from its tracking, which is the case when the agent is known to have given up its copy of the cogran. An operation 1004 determines if the base SFT base entry has its tracking_mode field set to AID. If so, an operation 1006 further determines if the AID that is to be removed from the base SFT entry is the only remaining AID is the base SFT entry. If the AID that is to be removed from the base SFT entry is the only remaining AID is the base SFT entry, the logical SFT entry is no longer needed to track the cogran because there are no remaining cached copies tracked by the SFT. Therefore, an operation 1010 changes the entry_state field of the base SFT entry to IDLE. If the AID that is to be removed from the base SFT entry is not the only remaining AID in the base SFT entry, an operation 1012 removes the AID from the base SFT entry's tracking_info. For example, the VLD subfield bit in the tracking_info that corresponds to the AID to remove is cleared.

If the operation 1004 determines that the tracking_mode field of the base SFT entry is not set to AID, an operation 1008 determines if the tracking_mode field of the base SFT entry is set to "VECTOR." If the tracking_mode field of the base SFT entry is not set to "VECTOR," an operation 1016 determines that the tracking_mode is set to IMPRECISE. In this case, the then the tracking_info field is updated, if needed, to account for the removal of the AID from the logical entry's tracking.

On the other hand, if the tracking_mode field of the base SFT entry is set to "VECTOR," an operation 1014 clears the vector bit corresponding to the AID of the agent that's evicting the cogran. Subsequently, an operation 1018 determines if any more vector bits are still set. If no more vector bits are set, an operation 1020 changes the state of the base SFT entry's extra_state field to IDLE and an operation 1022 changes the state of the base SFT entry's entry_state field to IDLE.

Figure 11:
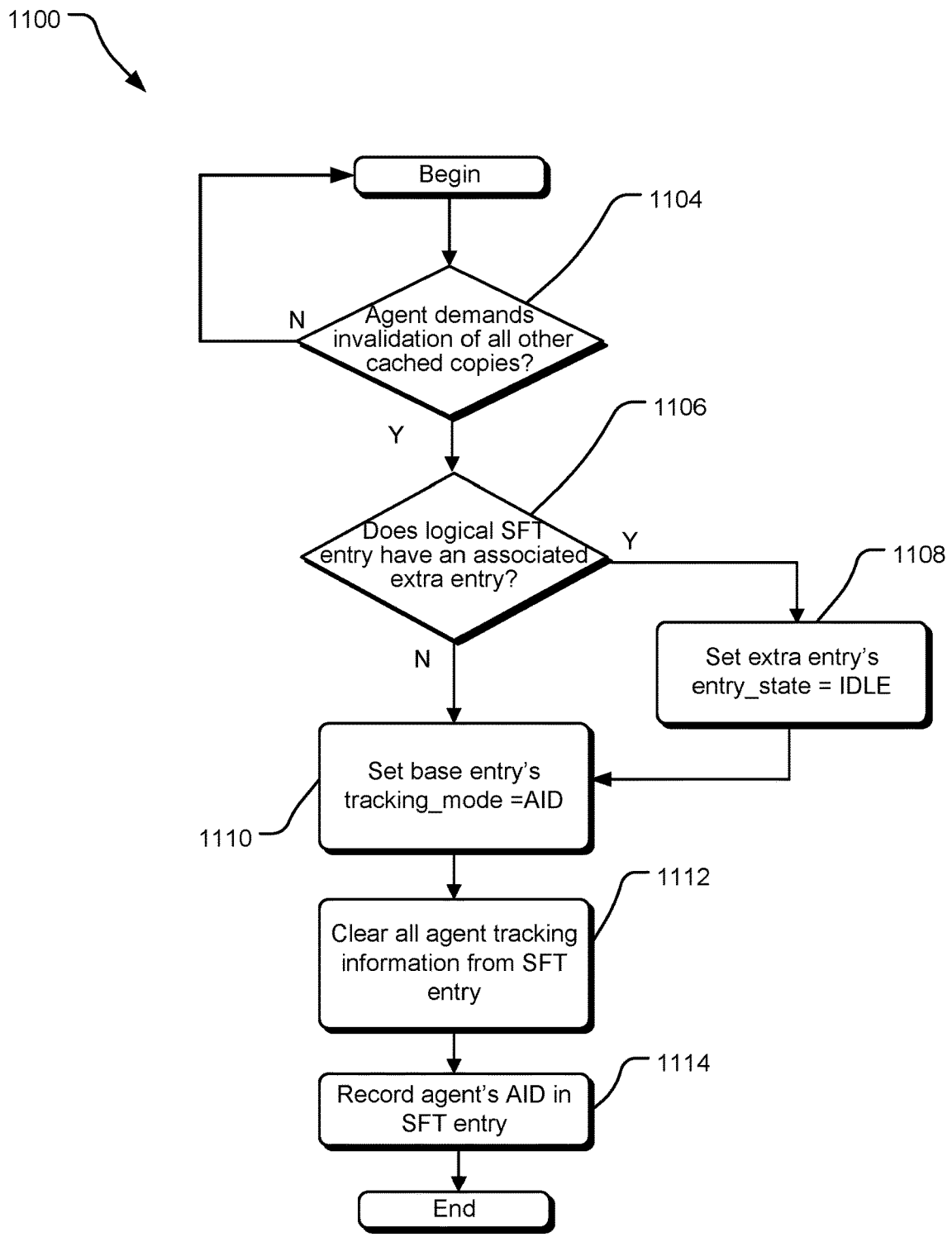
FIG. 11 illustrates example operations for a case when an agent may demand exclusive access to a cogran.

FIG. 11 illustrates operations 1100 for a case when an agent demands exclusive access to a cogran such that all other cached copies are invalidated, for example, so that the agent may update its copy of the cogran in a way that preserves cache coherence. Specifically, operations 1100 are performed when the SFT is already tracking a cogran at the time the agent demands to have such exclusive access to that cogran. An operation 1104 determines if an agent demands invalidation of all other cached copies. If so, an operation 1106 determines if the logical SFT entry has an associated extra entry. If the logical SFT entry has an associated extra entry, an operation 1108 sets the entry_state field of the extra entry to IDLE as it is no longer needed to track any other agents.

If the logical SFT entry does not have an associated extra entry, an operation 1110 sets the tracking_mode field of the base entry to AID. Subsequently, an operation 1112 clears all agent tracking information from the base SFT entry. Subsequently, an operation 1114 records the AID of the agent that's demanding exclusive access to the base SFT entry.

The cache coherence system disclosed herein preserves precise tracking for any number of agents caching a cogran concurrently. As a result, the amount of over-snooping is reduced when an access of the cogran triggers a snoop. Furthermore, when a snoop needs to be directed to any of the sharers to obtain a copy of the cogran, precise tracking enables the ability to select from a known sharer of the cogran. As agents evict the cogran from their caches, the SFT is able to be updated to reflect this. Eventually, when the last sharer evicts the cogran, the entry is able to be freed pro-actively. This helps with victim selection the next time the SFT needs to allocate a new cogran because there is already an available entry that can be used. Furthermore, this also improves victim selection because if/when the SFT needs to victimize an active entry, the filter flush snoop that it sends can be directed to only the agents that need to receive it rather than being broadcast to all agents.

For example, for tracking 128 agents, the implementations disclosed herein allow reducing the size of a physical SFT entry from 184 bits, as may be needed in alternative implementations, to 100 bits, thus providing a reduction in bit count of approximately 46%.

Figure 12:
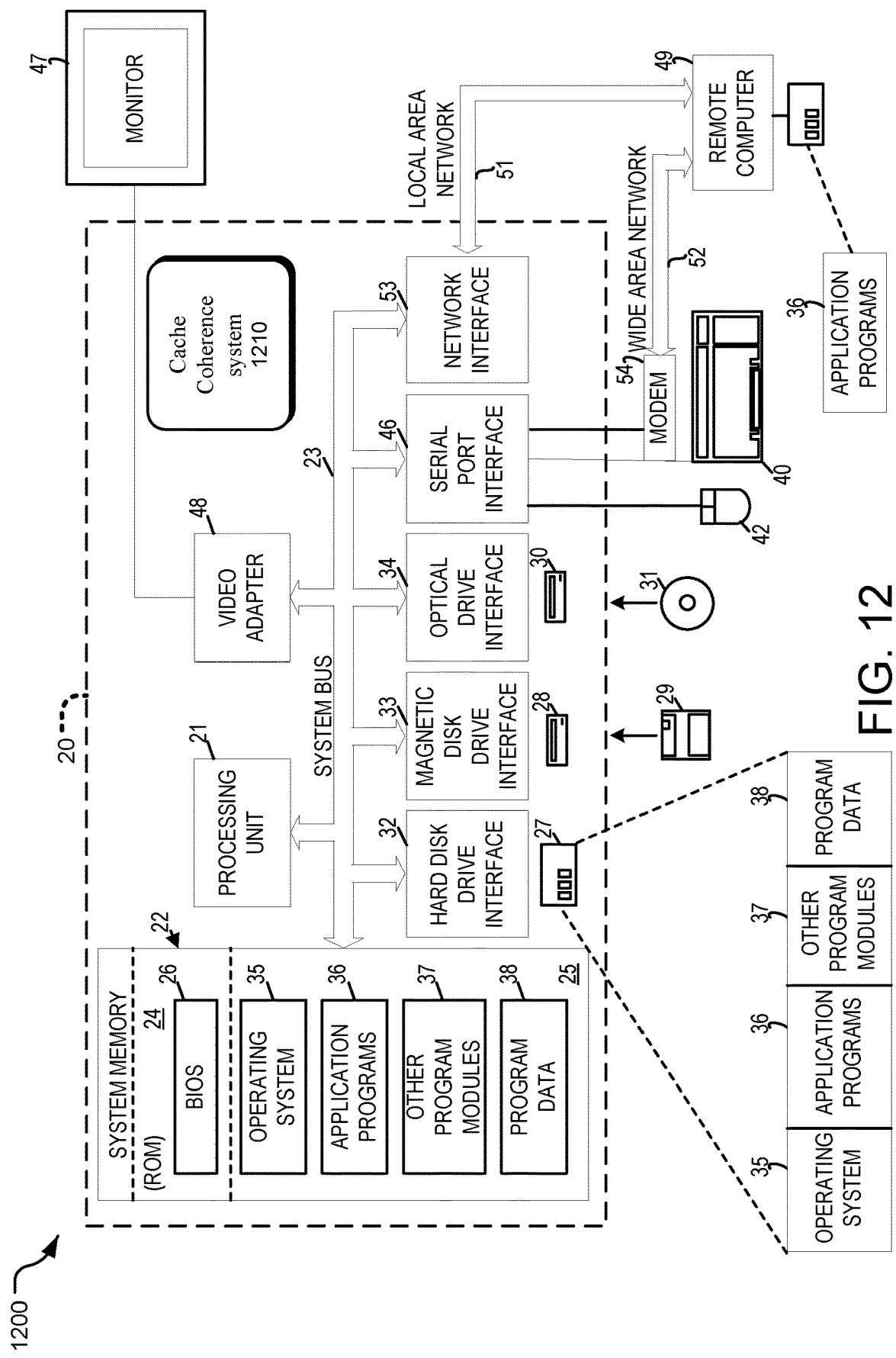
FIG. 12 illustrates an example system that may be useful in implementing the high latency query optimization system disclosed herein.

FIG. 12 illustrates an example system 1200 that may be useful in implementing the high latency query optimization system disclosed herein. The example hardware and operating environment of FIG. 12 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 12, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a high latency query optimization system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIGS. 6-11. Similarly, instructions stored on the memory of the computer 20 may also be used to implement one or more operations of FIGS. 6-11. The memory of the computer 20 may also one or more instructions to implement the high latency query optimization system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 12 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the cache coherence system 1210 may be stored in system memory 22 and/or storage devices 29 or 31 and processed by the processing unit 21. high latency query optimization system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of high latency query optimization system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The high latency query optimization system disclosed herein may include a variety of tangible computer-readable storage media and intangible computer-readable communication signals. Tangible computer-readable storage can be embodied by any available media that can be accessed by the high latency query optimization system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the high latency query optimization system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

An implementation of the technology disclosed herein provides a method including generating a base snoop filter (SFT) entry for a coherence granule (cogran) in agent cache, the base SFT entry comprising a tracking_information field configured to track a plurality of agent IDs, each agent ID identifying an agent that holds a copy of the cogran, determining a number of agents that hold the copy of the cogran, and in response to determining that the number of agents that hold the copy of the cogran is greater than the plurality of agent IDs tracked in the tracking_information field of the base SFT entry, generating an extra SFT entry, wherein the extra SFT entry is configured to store a portion of tracking vector wherein each bit of the tracking vector indicates cache validity state of the cogran for a related agent.

In an alternative implementation, the technology disclosed herein provides system including a memory, one or more processor units, and a cache coherence system stored in the memory and executable by the one or more processor units, the cache coherence system encoding computer-executable instructions on the memory for executing on the one or more processor units a computer process, the computer process including generating a base snoop filter (SFT) entry for a coherence granule (cogran) in agent cache, the base SFT entry comprising a tracking_information field configured to track a plurality of agent IDs, each agent ID identifying an agent that holds a copy of the cogran, determining a number of agents that hold the copy of the cogran, comparing the and number of agents that store the copy of the cogran with number of the plurality of agent IDs tracked in the tracking_information field of the base SFT entry; and in response to determining that the number of agents that hold the copy of the cogran is greater than the number of the plurality of agent IDs tracked in the tracking_information field of the base SFT entry, selecting a second SFT entry as an extra SFT entry, wherein the extra SFT entry is configured to store a portion of tracking vector wherein each bit of the tracking vector indicates cache validity state of the cogran for a related agent.

In another implementation, the technology disclosed herein includes One or more physically manufactured computer-readable storage media, encoding computer-executable instructions for executing on a computer system a computer process, the computer process including generating a base snoop filter (SFT) entry for a coherence granule (cogran) in agent cache, the base SFT entry comprising a tracking_information field configured to track a plurality of agent IDs, each agent ID identifying an agent that holds a copy of the cogran, determining a number of agents that hold the copy of the cogran, comparing the and number of agents that store the copy of the cogran with number of the plurality of agent IDs tracked in the tracking_information field of the base SFT entry; and in response to determining that the number of agents that hold the copy of the cogran is greater than the number of the plurality of agent IDs tracked in the tracking_information field of the base SFT entry, selecting a second SFT entry as an extra SFT entry, wherein the extra SFT entry is configured to store a portion of tracking vector wherein each bit of the tracking vector indicates cache validity state of the cogran for a related agent.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
   generating a base snoop filter (SFT) entry for a coherence granule (cogran) in agent cache, the base SFT entry comprising a tracking_information field configured to track a plurality of agent IDs, each agent ID identifying an agent that stores a copy of the cogran;
   determining a number of agents that hold the copy of the cogran;
   comparing the number of agents that store the copy of the cogran with number of the plurality of agent IDs tracked in the tracking_information field of the base SFT entry; and
   in response to determining that the number of agents that store the copy of the cogran is greater than the number of the plurality of agent IDs tracked in the tracking_information field of the base SFT entry, selecting a second SFT entry as an extra SFT entry, wherein the extra SFT entry is configured to store a portion of tracking vector wherein each bit of the tracking vector indicates cache validity state of the cogran for a related agent, adding an extra_entry field to the base SFT entry and setting the value of the extra_entry field to the second entry selected as the extra SFT entry, and setting an entry_state field of the base SFT entry to searchable.

2. The method of claim 1, wherein the extra SFT entry is configured to store a higher portion of tracking vector.

3. The method of claim 2, further comprising storing a lower portion of the tracking vector in the tracking_information field of the base SFT entry.

4. The method of claim 1, wherein selecting the second SFT entry as an extra SFT entry further comprising selecting a pre-assigned physical entry as the extra SFT entry for the base SFT entry.

5. The method of claim 1, further comprising:
   in response to generating the extra SFT entry, setting state of a tracking_mode field of the base SFT entry to VECTOR.

6. The method of claim 1, wherein a tracking_mode field of a logical SFT entry switches between one of AID, IMPRECISE, and VECTOR state, wherein the logical SFT entry comprises the base SFT entry and the extra SFT entry.

7. One or more physically manufactured tangible computer-readable storage media, encoding computer-executable instructions for executing on a computer system a computer process, the computer process comprising:
   generating a base snoop filter (SFT) entry for a coherence granule (cogran) in agent cache, the base SFT entry comprising a tracking_information field configured to track a plurality of agent IDs, each agent ID identifying an agent that holds a copy of the cogran;
   determining a number of agents that hold the copy of the cogran;
   comparing the number of agents that store the copy of the cogran with number of the plurality of agent IDs tracked in the tracking_information field of the base SFT entry; and
   in response to determining that the number of agents that hold the copy of the cogran is greater than the number of the plurality of agent IDs tracked in the tracking_information field of the base SFT entry, selecting a second SFT entry as an extra SFT entry, wherein the extra SFT entry is configured to store a portion of tracking vector wherein each bit of the tracking vector indicates cache validity state of the cogran for a related agent, adding an extra_entry field to the base SFT entry and setting the value of the extra_entry field to the second entry selected as the extra SFT entry, and setting an entry_state field of the base SFT entry to searchable.

8. The one or more physically manufactured tangible computer-readable storage media of manufacture of claim 7, wherein the extra SFT entry is configured to store a higher portion of tracking vector.

9. The one or more physically manufactured tangible computer-readable storage media of claim 8, wherein the computer process further comprising storing a lower portion of the tracking vector in the tracking_information field of the base SFT entry.

10. The one or more physically manufactured tangible computer-readable storage media of claim 7, wherein selecting the second SFT entry as an extra SFT entry further comprising selecting a pre-assigned physical entry as the extra SFT entry for the base SFT entry.

11. The one or more physically manufactured tangible computer-readable storage media of claim 7, wherein the computer process further comprising in response to generating the extra SFT entry, setting state of a tracking_mode field of the base SFT entry to VECTOR.

12. The one or more physically manufactured tangible computer-readable storage media of claim 8, wherein a tracking_mode field of a logical SFT entry switches between one of AID, IMPRECISE, and VECTOR state, wherein the logical SFT entry comprises the base SFT entry and the extra SFT entry.

13. A system comprising:
   memory;
   one or more processor units; and
   a cache coherence system stored in the memory and executable by the one or more processor units, the cache coherence system encoding computer-executable instructions on the memory for executing on the one or more processor units a computer process, the computer process comprising:
   generating a base snoop filter (SFT) entry for a coherence granule (cogran) in agent cache, the base SFT entry comprising a tracking_information field configured to track a plurality of agent IDs, each agent ID identifying an agent that holds a copy of the cogran;

determining a number of agents that hold the copy of the cogran;

comparing the number of agents that store the copy of the cogran with number of the plurality of agent IDs tracked in the tracking_information field of the base SFT entry; and in response to determining that the number of agents that hold the copy of the cogran is greater than the number of the plurality of agent IDs tracked in the tracking_information field of the base SFT entry, selecting a second SFT entry as an extra SFT entry, wherein the extra SFT entry is configured to store a portion of tracking vector wherein each bit of the tracking vector indicates cache validity state of the cogran for a related agent, adding an extra_entry field to the base SFT entry and setting the value of the extra_entry field to the second entry selected as the extra SFT entry, and setting an entry_state field of the base SFT entry to searchable.

14. The system of claim 13, wherein the extra SFT entry is configured to store a higher portion of tracking vector.

15. The system of claim 13, wherein the computer process further comprising storing a lower portion of the tracking vector in the tracking_information field of the base SFT entry.

16. The system of claim 14, wherein selecting the second SFT entry as an extra SFT entry further comprising selecting a pre-assigned physical entry as the extra SFT entry for the base SFT entry.

17. The system of claim 13, wherein a tracking_mode field of a logical SFT entry switches between one of AID, IMPRECISE, and VECTOR state, wherein the logical SFT entry comprises the base SFT entry and the extra SFT entry.

* * * * *